(12) United States Patent
Balasubramaniam et al.

(10) Patent No.: US 10,990,846 B2
(45) Date of Patent: Apr. 27, 2021

(54) PATTERN MATCHING TO DETECT DEFECTS IN ROD LIFT DOWNHOLE CARDS

(71) Applicant: GE Inspection Technologies, LP, Lewistown, PA (US)

(72) Inventors: Mahadevan Balasubramaniam, Mechanicville, NY (US); Shyam Sivaramakrishnan, Lewistown, PA (US); Arun Karthi Subramaniyan, Danville, CA (US)

(73) Assignee: GE INSPECTION TECHNOLOGIES, LP, Lewistown, PA (US)

( * ) Notice: Subject to any disclaimer, the term of this patent is extended or adjusted under 35 U.S.C. 154(b) by 69 days.

(21) Appl. No.: 16/258,031

(22) Filed: Jan. 25, 2019

(65) Prior Publication Data

US 2019/0236401 A1 Aug. 1, 2019

Related U.S. Application Data

(60) Provisional application No. 62/622,730, filed on Jan. 26, 2018.

(51) Int. Cl.
*G06K 9/46* (2006.01)
*G06K 9/66* (2006.01)
(Continued)

(52) U.S. Cl.
CPC ............ *G06K 9/623* (2013.01); *G01L 5/0042* (2013.01); *G06K 9/6215* (2013.01); *G06K 9/6219* (2013.01); *G06T 7/0002* (2013.01)

(58) Field of Classification Search
CPC ........ E21B 43/126; E21B 43/129; E21B 7/06; E21B 44/00; E21B 17/0426; G06K 9/623; G06K 9/6215; G06K 9/6219; G06T 7/0002; G06T 7/001; B05D 1/06; B05D 7/546; F04B 47/145; F04B 53/129; F04B 43/04; F04B 43/046; F16H 7/023; F04C 13/008;
(Continued)

(56) References Cited

U.S. PATENT DOCUMENTS 5,797,452 A * 8/1998 Martin .................. E21B 43/129
166/110
6,281,489 B1 8/2001 Tubel et al.
(Continued)

OTHER PUBLICATIONS

Peng Xu et al., "Application of Self-Organizing Competitive Neural Network in Fault Diagnosis of Suck Rod Pumping System", Journal of Petroleum Science and Engineering, Aug. 31, 2007, pp. 43-48.
(Continued)

*Primary Examiner* — Guillermo M Rivera-Martinez
(74) *Attorney, Agent, or Firm* — Mintz Levin Cohn Ferris Glovsky and Popeo, PC; Lisa Adams

(57) ABSTRACT

Data characterizing a load on a rod of a down-hole pump at different positions of a stroke of the rod can be received. An image characterizing the load of the rod at the different positions of the stroke can be determined. A defect in operating conditions of the down-hole pump can be determined. The determining can include comparing the image to a set of predetermined images with associated defects. The determined defect can be provided.

22 Claims, 13 Drawing Sheets

(51) Int. Cl.
*G06K 9/62* (2006.01)
*G01L 5/00* (2006.01)
*G06T 7/00* (2017.01)

(58) Field of Classification Search
CPC .. F04C 2/082; F04C 2/18; F16B 7/182; Y10T 403/68; G01B 11/028
USPC ..... 382/195; 418/1, 132, 152; 417/403, 263, 417/264
See application file for complete search history.

(56) References Cited

U.S. PATENT DOCUMENTS

| | | | | |
|---|---|---|---|---|
| 6,347,668 | B1* | 2/2002 | McNeill | E21B 21/10 166/105 |
| 2001/0045104 | A1 | 11/2001 | Bailey et al. | |
| 2002/0076273 | A1* | 6/2002 | Carstensen | E21B 17/0426 403/305 |
| 2003/0044299 | A1* | 3/2003 | Thomas | F04C 2/18 418/206.9 |
| 2006/0271299 | A1 | 11/2006 | Ward et al. | |
| 2012/0025997 | A1 | 2/2012 | Liu et al. | |
| 2012/0230841 | A1* | 9/2012 | Gregory | F04B 47/02 417/44.1 |
| 2015/0308242 | A1* | 10/2015 | Suprick | F04B 47/022 700/282 |
| 2017/0283958 | A1* | 10/2017 | Fraser | E21B 17/00 |
| 2017/0306745 | A1* | 10/2017 | Harding | F04B 17/03 |
| 2018/0164221 | A1* | 6/2018 | Singh | A61K 49/0058 |
| 2018/0298744 | A1* | 10/2018 | Ebrahimi | E21B 41/0092 |
| 2019/0218903 | A1* | 7/2019 | Moreno | E21B 47/12 |

OTHER PUBLICATIONS

International Search Report and Written Opinion issued in corresponding International Application No. PCT/US2019/015198, dated May 17, 2019, 10 pages.

* cited by examiner

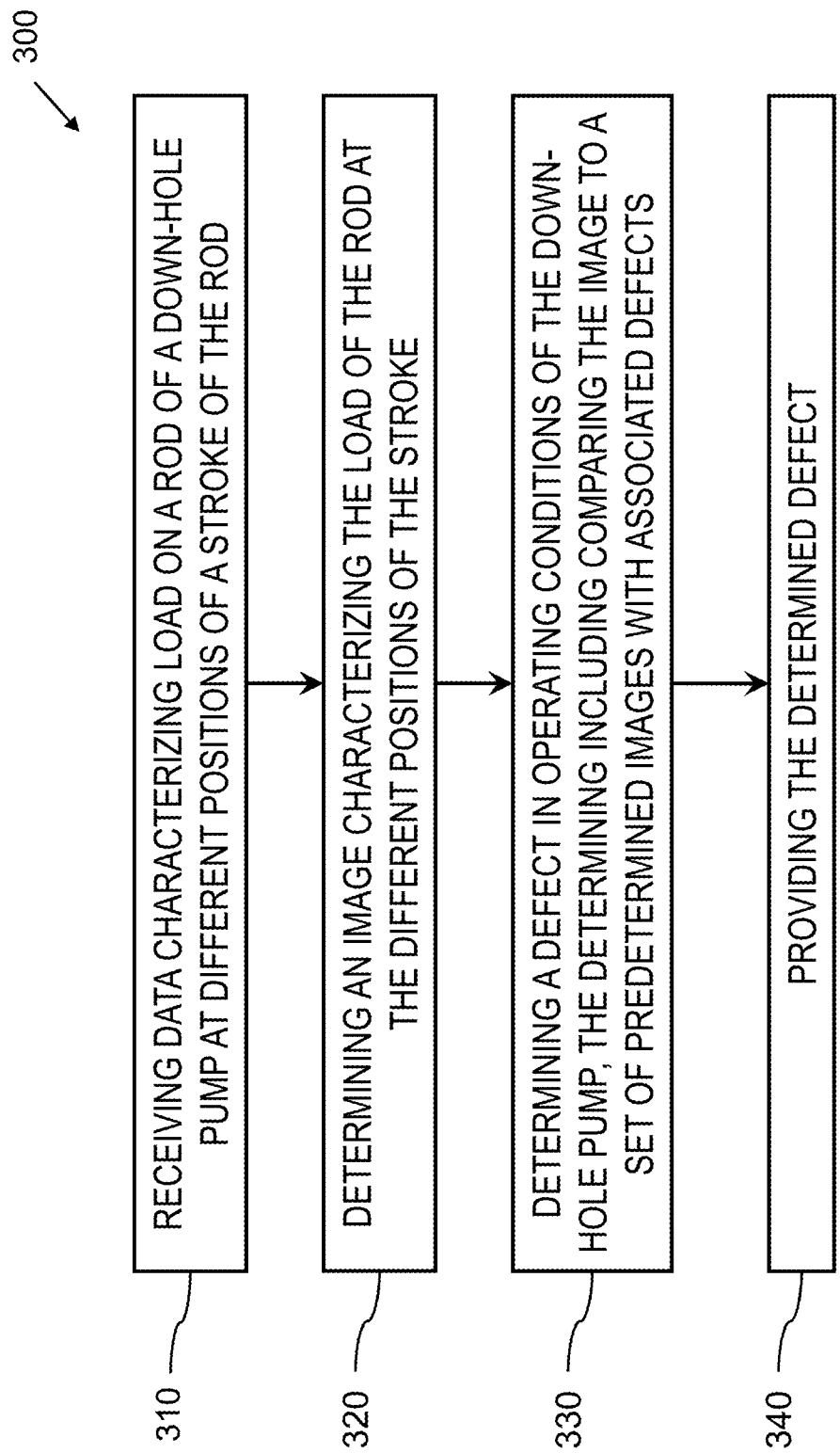

PATTERN MATCHING TO DETECT DEFECTS IN ROD LIFT DOWNHOLE CARDS

CROSS-REFERENCE TO RELATED APPLICATIONS

This application claims the benefit of U.S. Provisional Application. No. 62/622,730, filed on Jan. 26, 2018 and entitled "PATTERN MATCHING TO DETECT DEFECTS IN ROD LIFT DOWNHOLE CARDS," the entirety of which is hereby incorporated by reference.

BACKGROUND

A rod pump is a device that can be used to pump for oil on land. A hole can be drilled into the ground and cemented with a well casing, resulting in a vertical cavity. An assembled series of rods, referred to as a rod string, can be inserted into the vertical cavity and moved up and down using the rod pump. A plunger can be attached to the bottom of the rod string for transporting the oil out of the bottom of the well. On the downward stroke, the plunger can be filled with oil, and on the upward stroke the oil can be transported to the surface, where it can be extracted and put into barrels.

Unsatisfactory operation and performance can result from defects in the rod pump. These defects can include incomplete pump fillage, gas interference, tubing movement, excessive fluid slippage (e.g., indicating a worn rod pump), bottom pump tagging, top pump tagging, erratic valve action (e.g., due to solids in the well, a worn ball, a warn seat, a pitted ball, a pitted seat, and/or the like), plunger sticking or excessive friction (e.g., due to solids in between the plunger and the barrel), amongst others. Thus, it can be desirable to monitor rod pumps in order to identify when unsatisfactory operation is occurring so that corrective maintenance can be performed.

SUMMARY

A dynamometer is a type of sensor that can be used to quantify a load (e.g., force, stress, etc.) on the rod string, allowing characterization of how the pump is operating from stroke to stroke. The dynamometer can be attached to the top of the rod string, and it can measure the load on the rod during the upward stroke when the plunger carries a fluid load, and during the downward stroke when the plunger releases the fluid. A plot of the measured load as a function of stroke, referred to as a surface card, can be generated. A physics transformation, such as the wave equation, can account for external factors (e.g., friction, the elastic nature of the rod string in its dynamic motion, and/or the like) and can be applied to the plot to filter out these external factors. The resulting plot can be transformed into an image, referred to as a downhole card or Dynagraph.

By observing the size and shape of the image during a stroke of the rod pump, the operating conditions and performance of the pump can be evaluated. As an example, one or more images representative of different known, predetermined defect behaviors, referred to as reference cards, can be assembled in a set, referred to as a library. In this representation, a measured downhole card can be manually compared with one or more reference cards of an assembled library to determine if the operating condition and performance of the pump characterized by the measured downhole card corresponds to a defect behavior associated with one or more of the reference cards of the library.

However, the library of reference cards can be relatively large (e.g., hundreds of reference cards) to account for a range of possible defect behaviors for a given pump. Visually comparing each measurement card with each reference card of a library can be time consuming and prone to error and/or inconsistency due to subjective determinations made during manual review. These issues can be compounded when monitoring multiple pumps. Furthermore, if a defect behavior is not represented in at least one of the reference cards of the library, it can go unidentified.

In general, embodiments of the present disclosure provide systems and methods for real time, automated defect detection utilizing pattern matching. As discussed in detail below, a pattern matching system can be employed to quickly identify defect behaviors in downhole cards from comparison with one or more reference cards of a library with accuracy and consistency. In some implementations, the pattern matching system can facilitate real time detection of unsatisfactory operating conditions and/or performance deterioration.

In further embodiments, measured downhole cards can be designated as reference cards and added to the library, augmenting the library over time and allowing for new understanding of unsatisfactory operating condition and/or performance deterioration. As an example, a measured downhole card that is not matched to a reference card in the library, or alternatively is matched to multiple reference cards, can represent a new type of defect not captured by a single reference cards of the library. A known defect can also be associated with such a measured downhole card, it can be added, by the pattern matching system, to the library as a reference card for future identification of this defect. Alternatively, the measured downhole As discussed in detail below, pattern matching can be performed by embodiments of the pattern matching system in a variety of ways. In some instances, the entire shape and size of a measured downhole card can be compared to the entire shape and size of selected reference cards of a library. In other embodiments, a measurement card can be transformed into a turning angle representation that can characterize the cumulative length of segments forming the shape of the measured downhole card and cumulative angles between adjacent segments. Corresponding turning angle representations of reference cards can be employed for pattern matching. Furthermore, selected portions of measured downhole cards and reference cards in the turning angle representation can be compared to one another. Such limited comparisons can be advantageous under circumstances where defect behavior can be identified from a portion of a measured downhole card, rather than the entire measured downhole card, allowing for accelerated query execution, and rapidly performing the defect detection for thousands of wells over time. Additionally, under circumstances where more than one defect behavior is represented by a measured downhole card, use of turning angle representations of selected portions of the measured downhole card and reference cards can facilitate identification of multiple defects.

In further embodiments these pattern matching techniques can be combined with one another. As an example, pattern matching based upon the entire size and shape of a measured downhole card can be initially employed as a coarse filter for identification of a subset of the reference cards of a library that can potentially match a defect behavior represented in the measured downhole card. This subset of reference cards can be subjected to pattern matching based upon turning angle representations to uniquely identify defect behavior represented by the measured downhole card.

In one embodiment, a method for pattern recognition of downhole cards is provided. The method can include receiving data characterizing a load on a rod of a down-hole pump at different positions of a stroke of the rod. The method can also include determining an image characterizing the load of the rod at the different positions of the stroke. The method can further include determining a defect in operating conditions of the down-hole pump by comparing the determined image to a set of predetermined images with associated defects. The method can additionally include outputting a notification representing the determined defect.

In another embodiment, the set of predetermined images can include at least a first predetermined image and a second predetermined image. The comparing can further include calculating a first cross-correlation metric between the determined image and the first predetermined image and a second cross-correlation metric between the determined image and the second predetermined image. The comparing can also include determining a first peak of the first cross-correlation metric and a second peak of the second cross-correlation metric. The comparing can additionally include determining a quantitative ranking order between the first peak and the second peak. The determined defect can correspond to a predetermined defect associated with a predetermined image from the first predetermined image and the second predetermined image with a highest ranked peak in the quantitative ranking order.

In another embodiment, the set of predetermined images can include at least a first predetermined image. The comparing can include receiving data that can characterize a dissimilarity threshold. The comparing can also include transforming the determined image into a plot of cumulative turning angle as a function of cumulative perimeter distance. The comparing can also include transforming the first predetermined image into a first predetermined plot of cumulative turning angle as a function of cumulative turning angle. The comparing can also include determining a first distance between a portion of the plot and a corresponding portion of the first predetermined plot is below the dissimilarity threshold. The determined defect can include at least a predetermined defect associated with the first predetermined image.

In another embodiment, determining the image can include plotting discrete measurements of the load as a function of positions of the stroke, interpolating a boundary around the plot (e.g., between respective ones of the discrete measurements), where the boundary can enclose an interior region of the plot, assigning a first pixel value to points inside the interior region, and assigning a second pixel value to points outside the interior region.

In another embodiment, similarly shaped images of the set of predetermined images can be clustered together based on a hierarchical clustering. In another embodiment, the hierarchical clustering can be based on a threshold value.

In another embodiment, the associated defects can include incomplete pump fillage, gas interference, tubing movement, excessive fluid slippage, bottom pump tagging, top pump tagging, erratic valve action, plunger sticking, or excessive friction.

In another embodiment, the load on the rod of the down-hole pump at different positions of the stroke of the rod can be measured by a dynamometer.

In another embodiment, the determined image can be added to the set of predetermined images.

In an embodiment, a system is provided and can include at least one data processor and a memory. The memory can store instructions that, when executed by the at least one data processor, perform operations including: receiving data characterizing a load on a rod of a down-hole pump at different positions of a stroke of the rod, determining an image characterizing the load of the rod at the different positions of the stroke, determining a defect in operating conditions of the down-hole pump by comparing the determined image to a set of predetermined images with associated defects, and providing the determined defect.

In another embodiment, the set of predetermined images can include at least a first predetermined image and a second predetermined image, and the comparing can further include: calculating a first cross-correlation metric between the determined image and the first predetermined image and a second cross-correlation metric between the determined image and the second predetermined image. The comparing can also include determining a first peak of the first cross-correlation metric and a second peak of the second cross-correlation metric. The comparing can additionally include determining a quantitative ranking order between the first peak and the second peak. the determined defect can correspond to a predetermined defect associated with a predetermined image from the first predetermined image and the second predetermined image with a highest ranked peak in the quantitative ranking order.

In another embodiment, the set of predetermined images can include at least a first predetermined image and the comparing can further include receiving data characterizing a dissimilarity threshold. The comparing can also include transforming the determined image into a plot of cumulative turning angle as a function of cumulative perimeter distance. The comparing can additionally include transforming the first predetermined image into a first predetermined plot of cumulative turning angle as a function of cumulative turning angle. The comparing can also include determining a first distance between a portion of the plot and a corresponding portion of the first predetermined plot to be below the dissimilarity threshold. The determined defect can include at least a predetermined defect associated with the first predetermined image.

In another embodiment, determining the images can also include: plotting a plot of the load as a function of positions of the stroke of the rod, interpolating a boundary around the plot, the boundary enclosing an interior region of the plot, and assigning a first pixel value to points inside the interior region and a second pixel value to points outside the interior region.

In another embodiment, similarly shaped images of the set of predetermined images can be clustered together based on a hierarchical clustering. The hierarchical clustering can be based on a threshold value.

In another embodiment, the load on the rod of the down-hole pump at different positions of the stroke of the rod can be measured by a dynamometer.

In another embodiment, the determined image can be added to the set of predetermined images.

In an embodiment, a non-transitory computer program product (e.g., physically embodied computer program product) can also be provided. The non-transitory computer program product can store instructions which, when executed by one or more data processors of one or more computing systems, causes at least one data processor to perform one or more operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

DESCRIPTION OF DRAWINGS

These and other features will be more readily understood from the following detailed description taken in conjunction with the accompanying drawings, in which:

FIG. 3 is a flow diagram illustrating an exemplary embodiment of a method for detecting a defect in operating conditions of a down-hole pump;

It is noted that the drawings are not necessarily to scale. The drawings are intended to depict only typical aspects of the subject matter disclosed herein, and therefore should not be considered as limiting the scope of the disclosure.

DETAILED DESCRIPTION

Machines, such as rod pumps employed in oil extraction, can be monitored in order to identify unsatisfactory operation and performance. As an example, measurements of force and corresponding movement of a rod pump, referred to as stroke, can be measured and converted into a plot with force on one axis and stroke on another axis. The plot can be transformed into an image, referred to as a downhole card, and compared to a predetermined image which contains a known problem behavior, referred to as a reference card. If the downhole card and the reference card match, it can be determined that the rod pump experiences the known problem behavior represented by the reference card. Currently, these comparisons are performed manually by a technician. However, because there are many types of possible problem behaviors, performing manual comparisons can be time consuming. Furthermore, different technicians can potentially make different subjective judgements whether or not a measurement card and a downhole card match one another, resulting in inconsistent defect identification. Accordingly, improved systems and methods for pattern matching of images and predetermined images are provided to address these problems. As discussed in detail below, in one aspect, the entire size and shape of a measured downhole cards can be quantified and compared to the entire size and shape of one or more reference cards. In another aspect, selected portions of a measured downhole card can be quantified and compared to respective selected portions of one or more reference cards. In this manner, defect behavior can be identified from downhole cards with greater speed and accuracy.

Figure 1A:
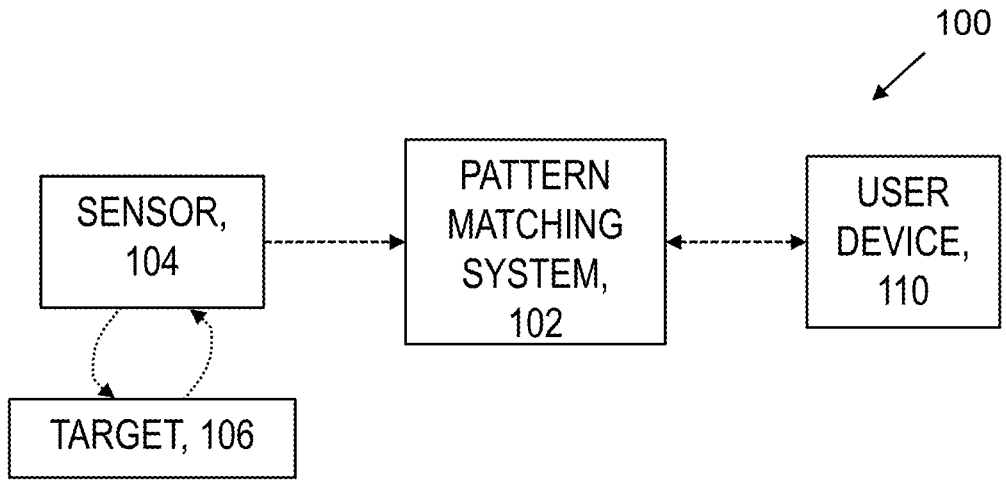
FIG. 1A is a diagram illustrating an exemplary embodiment of an operating environment including a pattern matching system and a sensor operatively coupled to a target.

FIG. 1A illustrates an exemplary embodiment of an operating environment 100 including a pattern matching system 102, a sensor 104, a target 106, and a user device 110. In an exemplary embodiment, the target 106 can include a top rod of a rod pump system and the sensor 104 can include a surface dynamometer. The sensor 104 can be operatively coupled to the target 106, such as a surface dynamometer operatively coupled to a top rod of a rod pump system. The sensor 104 can be configured to acquire measurements from the target 106. For example, the dynamometer can acquire measurements of load at the top rod as a function of rod stroke, or position.

The pattern matching system 102 can be communicatively coupled to the sensor 104 and can be configured to receive the measurements of the target 106 acquired by the sensor 104. The pattern matching system 102 can be configured to facilitate automated real time pattern matching utilizing the received measurements of the target 106. Also, the pattern matching system 102 can be configured to detect (e.g., determine) unsatisfactory operating conditions and performance, or defects, in the received measurements. Additionally, the pattern matching system 102 can be configured to provide the detected defects to the user device 110. An exemplary embodiment of the pattern matching system 102 is discussed in detail below with reference to FIG. 1B.

The user device 110 can be communicatively coupled to the pattern matching system 102 and it can be configured to receive the detected defects. Also, the user device 110 can be configured to display the detected defects. For example, the user device 110 can be configured to display a visual representation of an identified (e.g., determined) defect.

Although not illustrated in FIG. 1A, the user device 110 can include a central processing unit, a random access memory, a communication system 150, an input/output system, and a display. For example, the user device 110 can include a computer (e.g., a laptop, a desktop, and/or the like), a handheld mobile device (e.g., a cell phone, tablet, personal digital assistant), and/or the like. Additionally, the user device 110 can be configured to trigger an alert upon detection of a defect. Although the pattern matching system 102 and the user device 110 are illustrated as independent components in FIG. 1A, the pattern matching system 102, the user device 110, and/or components of the user device 110 can be combined. Furthermore, the user device 110 can be configured to display a visual representation of a target overlaid with a defect of the target. For example, if the defect is tubing movement, the visual representation of the target can include tubing, and an indication of a defect including tubing movement can be overlaid upon the visual representation of the target.

Figure 2:
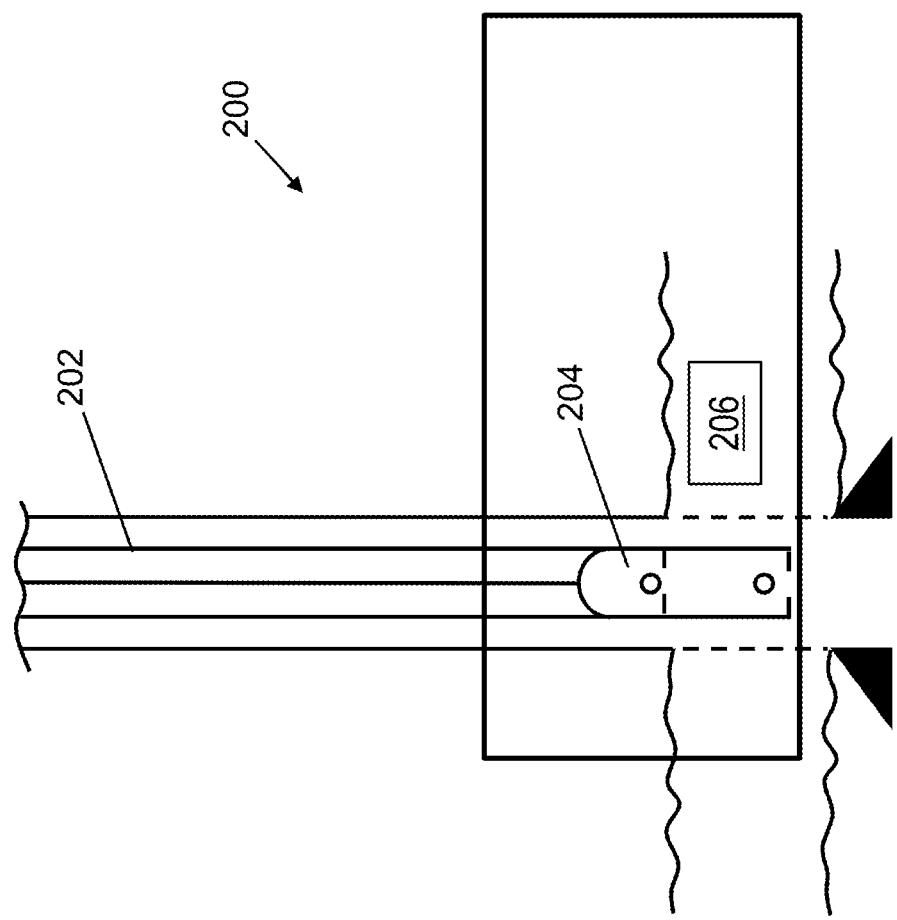
FIG. 2 is a diagram illustrating an exemplary embodiment of an operating environment including a dynamometer.

FIG. 2 illustrates an exemplary embodiment of a target 106 in the form of a rod pump system 200. Embodiments of the present disclosure can be employed to facilitate the real time automated detection of unsatisfactory operating conditions in the rod pump system 200. The rod pump system 200 can include a sucker rod 202 and a downhole pump 204. The sucker rod 202 can join together surface and downhole components of the rod pump system and can be moved up and down during operation of the rod pump. The downhole pump 204 can receive fluid from the well and the fluid can be transported to the surface by the downhole pump 204 during upward strokes of the rod pump system. A sensor 104, such as a dynamometer 206, can be operatively coupled to the downhole pump 204 and configured to acquire measurements from the downhole pump 204. For example, the dynamometer 206 can acquire a position, such as stroke position of the rod, and a load, such as load on the sucker rod 202 at different positions of the stroke of the rod corresponding to the position.

Figure 1B:
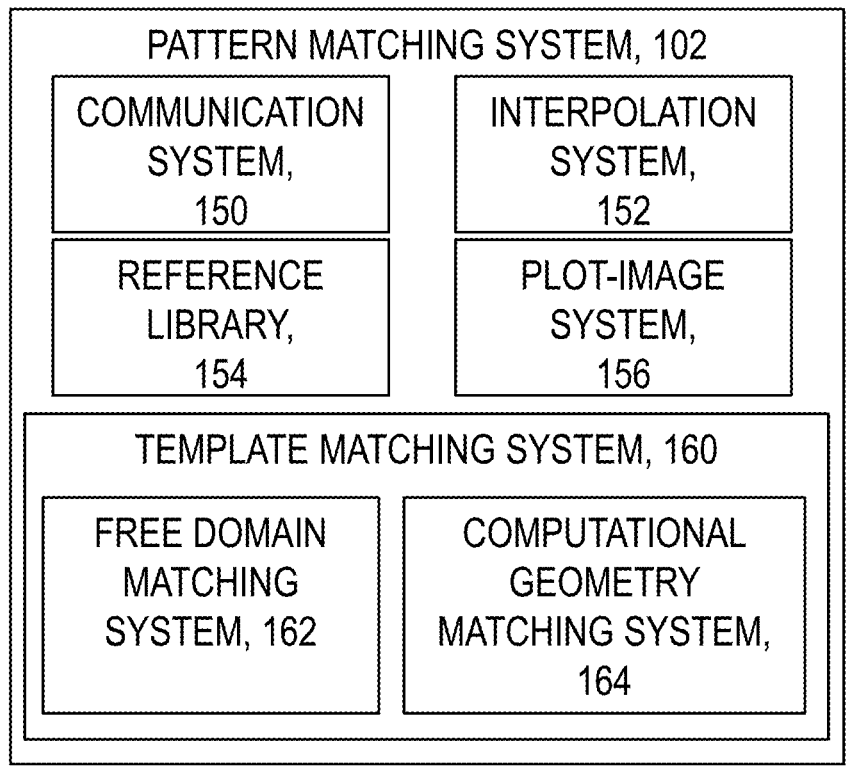
FIG. 1B is a diagram illustrating an exemplary embodiment of the pattern matching system of FIG. 1A.

As shown in FIG. 1B, an exemplary embodiment of the pattern matching system 102 can include a communication system 150, an interpolation system 152, a reference library 154 including a set of predetermined images or reference cards, a plot-image system 156, and a template matching system 160. As discussed above, the pattern matching system 102 can facilitate real time, automated defect detection by comparing an image associated with a test behavior of a target (e.g., a downhole card) to a set of predetermined images including one or more predetermined images associated with one or more defects (e.g., a library including one or more reference cards). The pattern matching system 102 can be operatively coupled to a sensor 104 and it can receive measurement data of the target 106 from the sensor 104.

The communication system 150 can be configured to receive measurement data characterizing a measurement of the target 106 from the sensor 104 and transmit a determined defect to the user device 110. The measurement can represent a test behavior of the target 106 (e.g., load and position). The determined defect can include an estimate of the similarity between the test behavior associated with the measurement and one or more defects associated with predetermined images in the set of predetermined images.

The communication system 150 can enable wired communication, such as via Ethernet, and can include a transceiver for communicating via a wireless protocol, such as a Bluetooth protocol, cellular protocol, IEEE 802.11b/g/n/ac direct sequence (Wi-Fi) protocol, near field communication (NFC) protocol, a radio frequency identification (RFID) protocol, and/or the like. Wired and/or wireless communication via the communication system 150 can be enables via any communication protocol, such as transmission control protocol/internet protocol (TCP/IP). Wireless cellular connectivity can include 4G, 4G LTE, 5G, or any mobile communication standard.

Figure 4A:
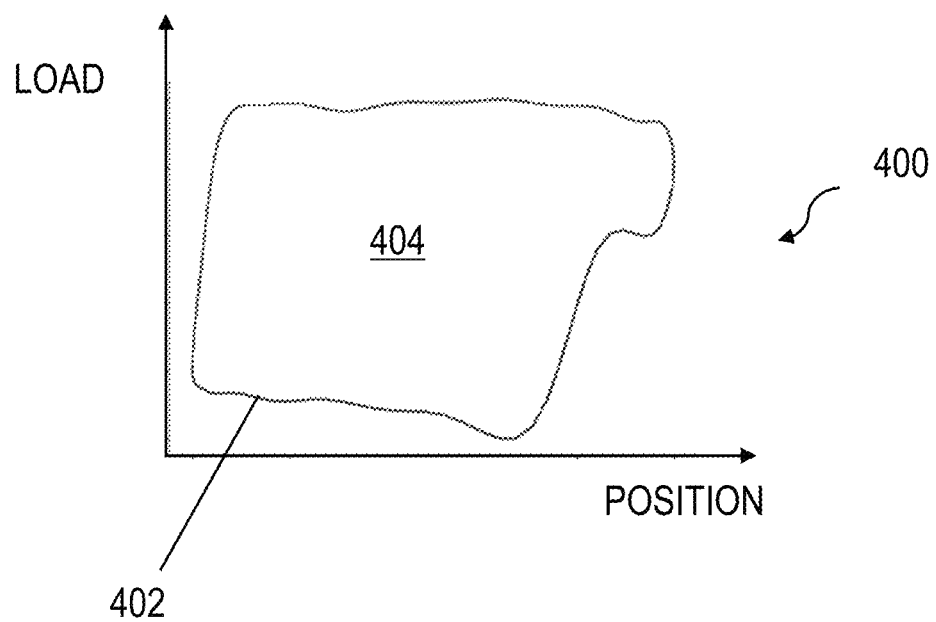
FIG. 4A is an exemplary plot of load as a function of position illustrating an interpolation of a dynamometer measurement in accordance with an exemplary embodiment of a method for detecting unsatisfactory operating conditions in a target.

The interpolation system 152 can be configured to receive the position and the load. The position and load can include measurements acquired (e.g., sampled) at discrete time intervals, referred to herein as time series data. The interpolation system 152 can interpolate, or construct, data points within the range of discrete position and load. The interpolated data points can represent a boundary enclosing an interior region of the shape (e.g., a polygon) outlined by a plot of the load as a function of the position, and will be discussed below in reference to the plot-image system 156. An example is illustrated in FIG. 4A and discussed in greater detail below.

Figure 5:
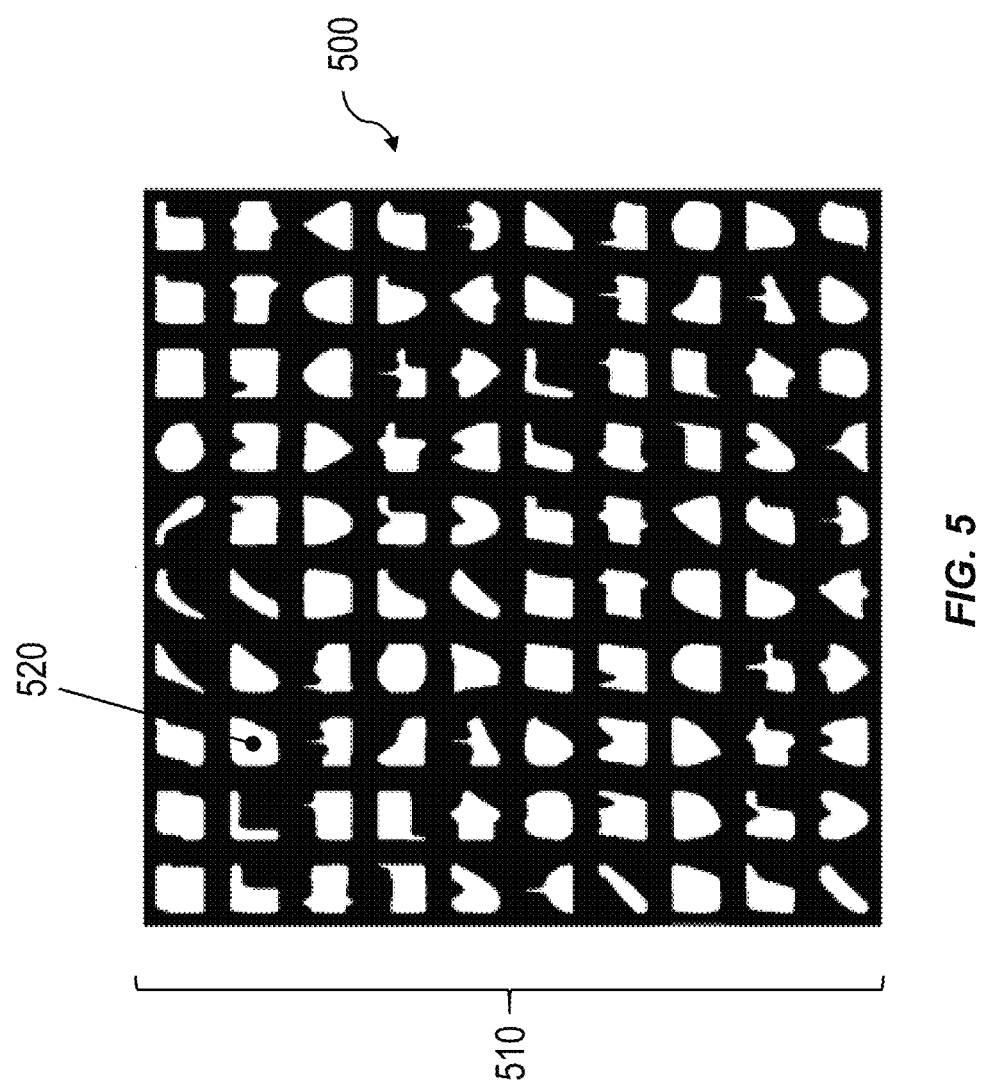
FIG. 5 is a diagram illustrating an exemplary embodiment of a set of predetermined images with associated defects.

The reference library 154 can include one or more predetermined images characterizing one or more defects of the target 106. For example, FIG. 5 illustrates an exemplary reference library 500 including one or more predetermined images 510. The set of predetermined images 510 can facilitate evaluating the operating conditions and performance of the target 106 characterized by an image. For example, the test behavior associated with the incoming image can be compared with all of the defects associated with one or more of the predetermined images in the set of predetermined images. In accordance with some embodiments of the current subject matter, the set of predetermined images can be expanded. For example, a user can be alerted that an image didn't match any predetermined image using the free domain matching system, or possibly matched one or more predetermined images, and the user can flag the image for further analysis. Additionally, the image can be equidistant from several predetermined images and/or clusters of predetermined clusters. Also, the image can exhibit defects associated with a combination of predetermined images. The clustering of the set of predetermined images associated with defects can be used to determine how "distinct" (e.g., distance from each predetermined image in the set of predetermined images associated with defects above a predetermined threshold) the image exhibiting defects is. The image exhibiting defects can be unique (e.g., clustered distinctly from each predetermined image in the set of predetermined images utilizing a cluster threshold) and can be added to the set of predetermined images associated with defects as a new predetermined image associated with the one or more defects exhibited in the image.

Figure 4B:
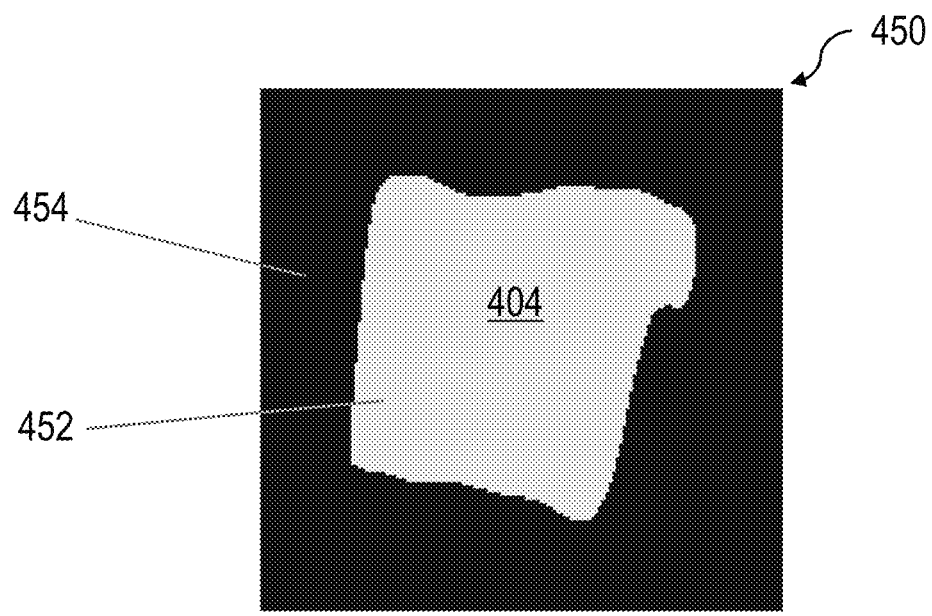
FIG. 4B is a diagram illustrating an exemplary embodiment of an image.

The plot-image system 156 can facilitate transforming a plot of the load as a function of the stroke into an image. For example, FIG. 4B illustrates an exemplary embodiment of an image. Incoming measurement data can differ in dynamometer installations and data sampling. Additionally, under some circumstances, the number of data samples corresponding to a predetermined image can differ from the number of data samples corresponding to measurement data. For example, the number of data samples utilized to construct a predetermined image can be smaller than the number of data samples in the measurement data. In some embodiments of the current subject matter, the number of samples corresponding the predetermined images can include around 76 data points per predetermined image and around 200 data points per measurement data. An image can be generated from measurement data samples by interpolating a boundary around a polygon enclosing an interior region of the data points. For example, a boundary can be interpolated around a circle enclosing an interior region of data points forming the shape of the circle. A predetermined image can be generated similarly. In some embodiments of the current subject matter, a set of predetermined images of one or more predetermined images are persistently stored, such as on persistent storage device (e.g., hard disk drives, solid state drives, and/or the like). This can facilitate real time automated detection of unsatisfactory operating conditions and performance in targets characterized by the incoming measurement data by utilizing pattern matching to compare an image to the one or more predetermined images included in the set of predetermined images.

To compare an image and a predetermined image, it can be desirable to adjust the values in the measurement data to a uniform scale corresponding to a scale of the predetermined images. In some embodiments of the current subject matter, the position and the load can be adjusted. For example, the position and the load can be adjusted to a predetermined measurement scale corresponding to a predetermined image scale. For example, the position and the load can be normalized. In some embodiments, the position and the load can be normalized in the scale of 1 to 2.

The template matching system 160 can facilitate real time automated detection of unsatisfactory target 106 operating conditions and performance by utilizing pattern matching to compare an image to one or more predetermined images. The template matching system 160 can include a data processor, including accelerated computing hardware, such as a graphics processing unit (GPU). In an exemplary embodiment, the GPU can include an NVIDIA® Jetson GPU, which can be low power, consuming approximately 90 watts. Additionally, the GPU can include approximately 256 GPU cores and can be capable of 1.5 Teraflops of parallel computing performance. As another example, an NVIDIA DGX station can be used if more computing power is desired. By taking advantage of parallel computing, analysis times can be reduced from days to minutes.

In an exemplary embodiment, the template matching system 160 can include a free domain matching system 162 and a computational geometry matching system 164. The free domain matching system 162 can provide ranked matches of defects associated with predetermined images. As such, the free domain matching system 162 can provide a determined defect for the image. The determined defect of the image can include the defect associated with the predetermined image most similar to the image, referred to herein as a global match. The computational geometry matching system 164 can provide local matches of defects associated with predetermined images. The computational geometry matching system 164 can compare portions of the image with portions of each predetermined image. As such, it can determine whether an image exhibits localized similarities associated with each defect.

In an exemplary embodiment, the free domain matching system 162 can receive an image and one or more predetermined images. For example, the image can be received from the plot-image system 156 and predetermined images can be received from the set of predetermined images. The free domain matching system 162 can utilize fast image correlation techniques to detect pattern matches between the image and the predetermined images and can identify unsatisfactory operating conditions and performance in a target 106. In some embodiments, the image can be traversed over the one or more predetermined images and a cross-correlation metric can be generated for each predetermined image. Peak detection can identify a peak cross-correlation value for each cross-correlation metric.

The peak cross-correlation value in each cross-correlation metric can correspond the centroid of a comparison (e.g., where the image and predetermined image are most similar). The peak cross-correlation value can determine the quantitative ranking order of similarity for each predetermined image. For example, the predetermined images can be ranked from most similar to least similar. The defect corresponding to the predetermined image most similar to the image can be provided as a determined defect of the test behavior associated with the image. In some embodiments, the image can be represented by a matrix of zeroes and ones, with a zero corresponding to a pixel outside the boundary of the interior region of the polygon formed by data points of the measurement data and a one corresponding to a pixel inside the boundary. Each of the predetermined images can be represented similarly.

Suitable digital image correlation techniques are contemplated, such as applying the fast Fourier transform. In an exemplary embodiment, $f(m,n)$ can represent a pixel value at a point $(m,n)$ in the image and $g(m,n)$ can represent the pixel value at a point $((m,n)$ in the predetermined image. The fast Fourier transform of the image matrix, $F=\mathcal{F}\{f\}$, and predetermined image matrix, $G=\mathcal{F}\{g\}$, can be computed. The complex conjugate of the fast Fourier transform of the reference matrix, $G^*$, can be computed. The Fourier transform of the correlogram, R, can be computed by multiplying the Fourier transform of the image matrix and the complex conjugate of the Fourier transform of the predetermined image matrix elementwise, $R=F \circ G^*$. The cross-correlation metric can be obtained by applying the inverse Fourier transform to the Fourier transform of the correlegram, $r=\mathcal{F}^{-1}\{R\}$. In some embodiments, peak detection can identify the centroid of matches in the cross-correlation metric.

In an exemplary embodiment, the computational geometry matching system 164 can receive an image and one or more predetermined images. For example, the image can be received from the plot-image system 156 and predetermined images can be received from the set of predetermined images. The computational geometry matching system 164 can transform the image and predetermined images into turning functions, or cumulative measures of the angles through which the image and predetermined image polygonal curves turn along a perimeter of the polygon formed by the boundary of the image and the predetermined image, respectively. These turning functions can be utilized to determine a measure of local similarity between the image and each predetermined image. This measure of local similarity between the image and each predetermined image can be utilized to determine one or more determined defects of the test behavior associated with the test behavior. For example, an image can exhibit local similarities to three predetermined images. As such, the test behavior associated with the image can be determined to correspond to the defects associated with the three predetermined images.

As described above a turning function is a cumulative measure of the angles through which a polygonal curve turns versus the perimeter of the polygon. In an exemplary embodiment, a turning function $\theta_A(s)$ of a polygon A can provide the angle between the counterclockwise tangent of the polygon and the x-axis as a function of distance s along the polygonal curve. The turning function can increase with left-hand turns and decrease with right-hand turns. Also, the turning function can be invariant under translation. Furthermore, a rotation of θ can cause a vertical shift of distance θ, and scaling can distort the turning function.

A measure of similarity between the image the predetermined image can be determined by determining the turning function of the polygon represented in image and the turning function of the polygon represented in the predetermined image. In an exemplary embodiment, the measure of similarity can be determined by computing a distance between the turning function of the polygon represented in the image and the turning function of the polygon represented in the predetermined image. For example, a Euclidean distance or $L_p$ metric can be computed. The $L_p$ metric between a polygon A and a polygon B can be defined as $|f_{A,B}|=\int |\theta_A(x)-\theta_B(x)|^p dx$. For example, to compare two turning functions $\theta_A$ and $\theta_B$ using the $L_2$ metric, the dissimilarity $d_{A,B}$ can be $d_{A,B}{}^2=\int(\theta_A(s)-\theta_B(s))^2\,ds$, which can correspond to a measure of the squared distance between the shapes of A and B. In some embodiments, a color can be assigned to plot boundaries based on distance. For example, similarly shaped plot boundaries can be assigned similar colors.

In some embodiments, the computational geometry matching system 164 can facilitate comparison of partial polygons. In an exemplary embodiment, portions of the boundary of the plot of the load as a function of the position can be matched instead of the entire boundary. For example, a section of a test plot and a section of a reference plot can be selected. A measure of dissimilarity between the section of the test plot and the section of the reference plot can be computed. A dissimilarity threshold can be utilized to determine that the section of the test plot and the section of the reference plot are not too dissimilar (e.g., the section of the test plot and the section of the reference plot are similar). For example, the measure of dissimilarity between the section of the test plot and the section of the reference plot can be below a received dissimilarity threshold and the section of the test plot and the section of the reference plot can be determined to be similar (e.g., not too dissimilar). The measure of dissimilarity between the sections can indicate the extent to which a portion of an image is similar to a corresponding portion of the predetermined image. For example, this local pattern matching can indicate an "extent of the fluid pound" in a given image. Local pattern matching, as described above, can rapidly identify local matches between a test behavior associated with the predetermined image and one or more defects associated with one or more predetermined images. Furthermore, local pattern matching can troubleshoot performance deterioration of the image and predetermined images.

In some embodiments, the ranked matches of defects associated with predetermined images (e.g., global matches) provided by the free domain matching system 162 can be combined with the measure of local similarity between the image and the predetermined images (e.g., global matches) provided by the computational geometry matching system 164. For example, the top-n global matches (e.g., top 10 ranked matches of defects associated with predetermined images) provided by the free domain matching system 162 can be provided to the computational geometry matching system 164. After turning function transformations on the image and the predetermined images associated with the top-n global matches, measures of local similarity between the image and the top-n predetermined images can be determined. The measure of dissimilarity between portions of the transformed image and the predetermined top-n predetermined images can indicate the extent to which portions of the top-n global matches are similar (e.g., least dissimilar) to the image.

FIG. 3 is a flow diagram illustrating an exemplary embodiment of a method 300 for detecting unsatisfactory operating conditions and performance of a target 106 in accordance with the current subject matter. Embodiments of the present disclosure can facilitate identification of one or more determined defects automatically and in real time (e.g., seconds, tens of seconds, hundreds of seconds, and/or the like) by utilizing comparing images to a set of predetermined images and matching global and/or local patterns between them.

In operation 310, data can be received. The data can characterize load on a rod of a down-hole pump at different positions of a stroke of the rod. In operation 320, an image can be determined. The image can characterize the load of the rod at the different positions of the stroke. In operation 330, a defect in operating conditions of the down-hole pump can be determined. The determining of the defect can include comparing the image to a set of predetermined images with associated defects. In operation 340, the determined defect can be provided.

In an exemplary embodiment, measurement data can be received from a sensor 104. For example, the sensor 104 can include a dynamometer (e.g., dynometer 206). The measurement data can be received by a communication system 150 of the pattern matching system 102 and can characterize a first measurement of a target 106. For example, the target 106 can include a rod pump system. The first measurement can represent a test behavior of the target 106. For example, the test behavior can characterize operating conditions and performance of the target 106. Also, the first measurement can include a position and a load corresponding to the position. For example, the position can include a stroke, or position, of a top rod of the rod pump, and the load can include a load at the top rod corresponding to the position of the top rod.

An image can be generated. The position and the load can be adjusted to a predetermined measurement data scale corresponding to a predetermined image scale. For example, the interpolation system 152 can adjust, or normalize, the position and the load to correspond with the predetermined measurement data scale. The adjusted load can be plotted as a function of the adjusted position. For example, the plot-image system 156 can plot load as a function of position. Additionally, the interpolation system 152 can interpolate a boundary enclosing an interior region of the plot of the adjusted load as a function of the adjusted position. The plot-image system 156 can generate the image. For example, the plot-image system 156 can assign a first pixel value to pixels within the interior region of the plot and a second pixel value to points outside the interior region of the plot.

A determined defect associated with the test behavior of the target 106 can be determined. For example, the free domain matching system 162 can receive the image from the plot-image system 156 and one or more predetermined images from a set of predetermined images. Each predetermined image can be associated with a defect of the target 106. The image can be compared with the one or more predetermined images. For example, a cross-correlation metric can be determined. A centroid of the matches can be identified using peak detection. A quantitative ranking order of the one or more cross-correlation metrics can be determined. The defect associated with the highest ranking cross-correlation metric can be provided as the determined defect. The determined defect can characterize operating conditions and performance of the target 106, including unsatisfactory operating conditions and performance. In operation 340, the determined defect can be provided. For example, a matrix including one or more visual representation of the cross-correlation metrics can be displayed on a user device 110. Additionally, a visual representation of the centroid of the matches can be displayed on the user device 110.

The plot of the adjusted load as a function of the adjusted position can be transformed into a test plot of cumulative turning angle as a function of cumulative perimeter distance. For example, the plot-image system 156 can perform the transformation. The transformation can include generating a test plot of the turning function of the adjusted load as a function of the adjusted position. For example, the turning function can provide the angle between the counterclockwise tangent of the plotted polygon and the x-axis as a function of distance along the polygonal curve. The turning function can increase with left-hand turns and decrease with right-hand turns.

The one or more predetermined images can be transformed into one or more reference plots of cumulative turning angle as a function of cumulative perimeter distance. For example, the plot-image system 156 can generate a plot of the one or more predetermined images and perform the transformation. The transformation can include generating a plot of the turning function of the plot of the one or more predetermined images. For example, the turning function can provide the angle between the counterclockwise tangent of the plotted polygon and the x-axis as a function of distance along the polygonal curve. The turning function can increase with left-hand turns and decrease with right-hand turns.

One or more defects associated with the test behavior of the target 106 can be determined. For example, the computational geometry matching system 164 can receive the test plot and one or more reference plots from the plot-image system 156. Each reference plot can be associated with a defect of the target 106. The test plot can be compared with the one or more reference plots. For example, a measure of dissimilarity can be computed between the test plot and each reference plot of the one or more reference plots. Additionally, a measure of dissimilarity can be computed between portions of the test plot and corresponding portions of each reference plot of the one or more reference plots. For example, the one or more determined defects can include the defect associated with each reference plot least dissimilar (e.g., most similar) to the test plot.

The one or more determined defects can be provided. For example, the one or more determined defects can be provided to a user device 110. Additionally, a visual representation of the matches can be provided to the user device 110. For example, a visual representation of the matches can include a matrix of the one or more defect along one axis and the test behavior on another. A color of the matrix entry corresponding to a particular defect and a portion of the test plot can correspond to a measure of dissimilarity between the portion of the test plot and the corresponding portion of the reference plot.

FIG. 4A is an exemplary embodiment of a plot 400 of the load as a function of the position (e.g., plot of load of a rod of a down-hole pump at different positions of a stroke of the rod, plot of load as a function of position, and/or the like). In an exemplary embodiment, load can be plotted as a function of position. The plot 400 can include a boundary 402 enclosing an interior region 404 of the load as a function of the position. FIG. 4B is an exemplary embodiment of an image 450 generated from the plot of FIG. 4A. The image 450 can include a first pixel value 452 and a second pixel value 454. The first pixel value 452 can correspond to pixels within an interior region of a plot of the load as a function of the position. The second pixel value 454 can correspond to pixels outside of the interior region.

FIG. 5 is an exemplary embodiment of a library 500 including one or more predetermined images 510. Each predetermined image can be associated with a defect (e.g., a defect). As discussed above, embodiments of defects can include one or more of incomplete pump fillage, gas interference, tubing movement, excessive fluid slippage, bottom pump tagging, top pump tagging, erratic valve action, plunger sticking, or excessive friction. For example, the predetermined image 520 can be associated with the defect of slight gas interference.

Figure 6C:
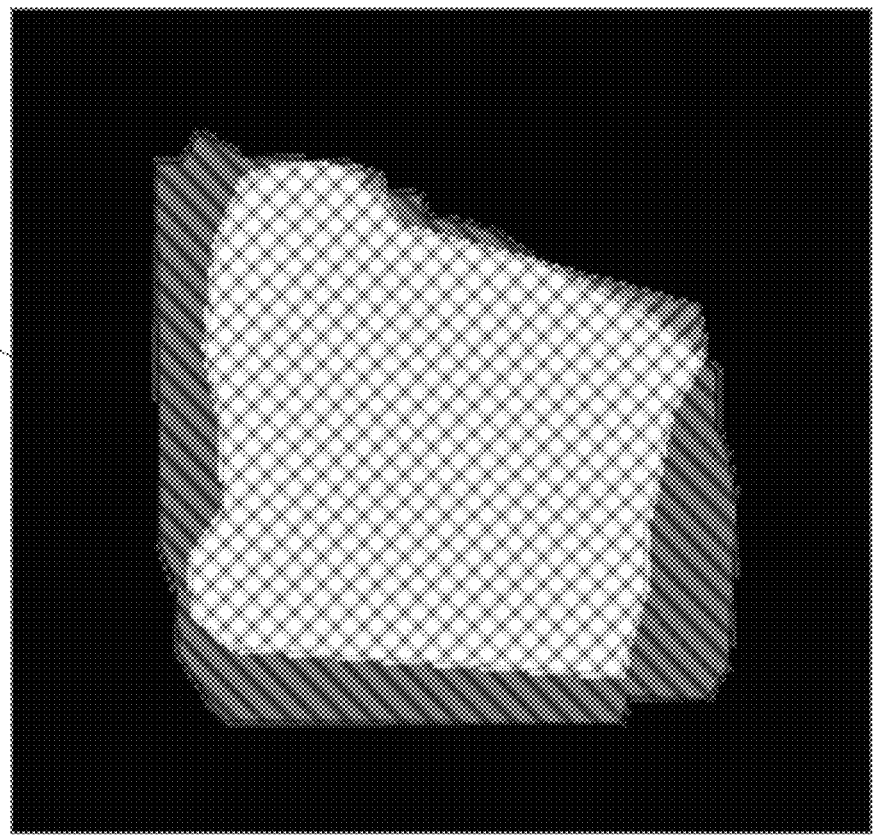
FIG. 6C is diagram illustrating an exemplary embodiment of a comparison between the image of FIG. 6A and the predetermined image of FIG. 6B.
Figure 6A:
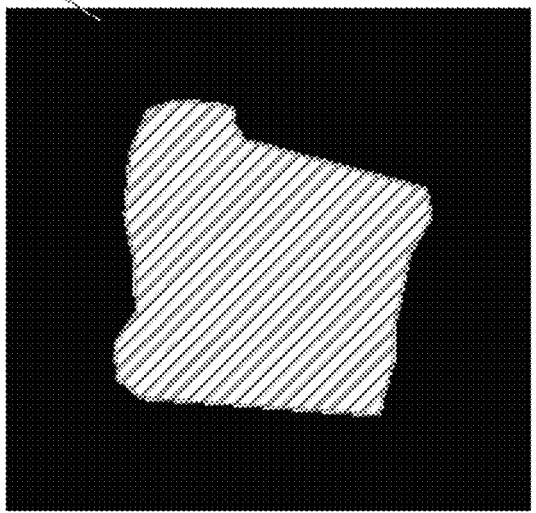
FIG. 6A is a diagram illustrating an exemplary embodiment of an image representing a measured downhole card.
Figure 6B:
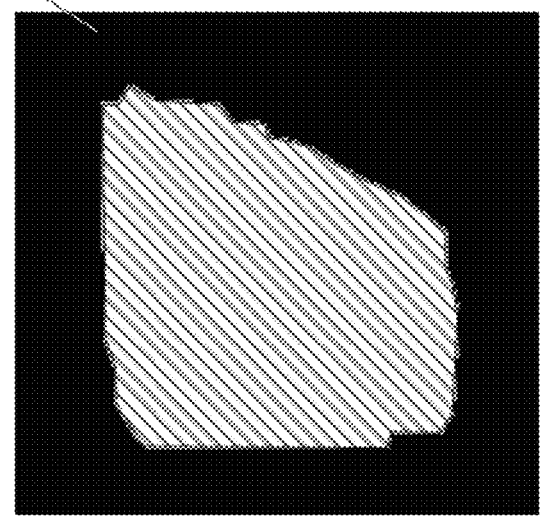
FIG. 6B is a diagram illustrating an exemplary embodiment of a predetermined image representing a reference card of a library.

FIG. 6A is an exemplary embodiment of an image or downhole card 600 generated in accordance with the current subject matter. In some embodiments, the interior region of the polygon in the downhole card can correspond to a first pixel value. FIG. 6B is an exemplary embodiment of a predetermined image or reference card 610 associated with a slight gas interference defect. In some embodiments, the interior region of the polygon in the predetermined image can correspond to a first pixel value. FIG. 6C is an exemplary embodiment of a comparison of the image 600 and the predetermined image 610. The comparison image 620 illustrated in FIG. 6C overlays the reference card upon the measured downhole card. For ease of illustrating this comparison, the downhole card 600 is presented with right-leaning hashing and the reference card 610 is illustrated with left-leaning hashing. The cross-hatched region of comparison image 620 represents portions of the downhole card 600 that match regions of the reference card 610.

Figure 7B:
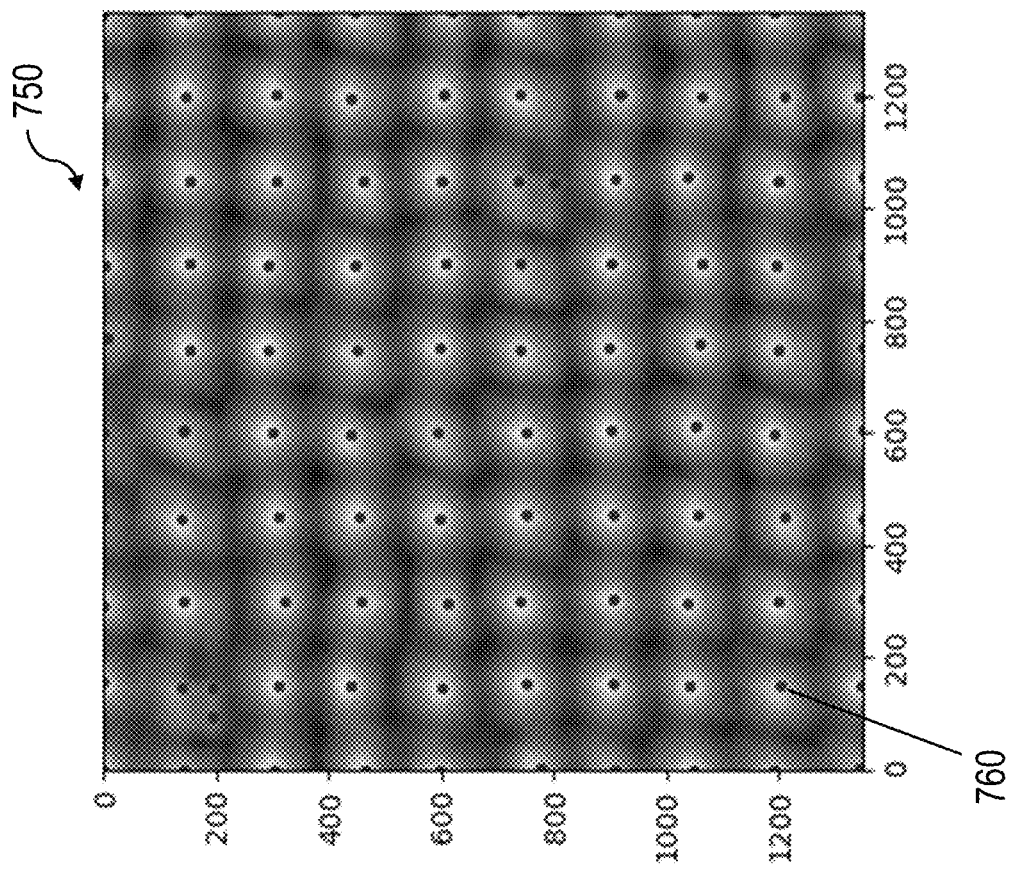
FIGS. 7A-7B are diagrams illustrating an exemplary embodiment of a visual representation of an estimate of a defect in an image.
Figure 7A:
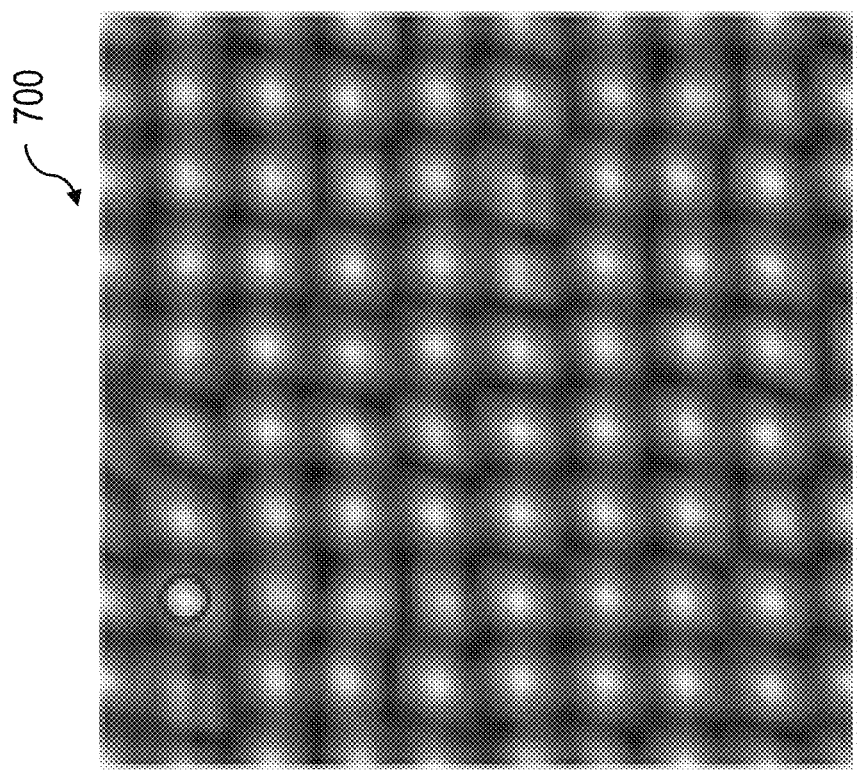

FIG. 7A and FIG. 7B are diagrams illustrating a matrix of different cross-correlation metrics 700 and centroids of matches 710 corresponding to comparing the image of FIG. 6A with the predetermined images included in the set of predetermined images of FIG. 5. With reference to FIG. 7A, the cross-correlation metric matrix 700 can include a visual representation of one or more cross-correlation metrics, with each cross-correlation metric corresponding to a comparison between an image and a predetermined image. For example, the cross-correlation metric matrix can include a visual representation of the comparison between the image and each predetermined image in a set of predetermined images. With reference to FIG. 7B, the centroid cross-correlation metric matrix 710 can include a visual representation of the centroids of matches corresponding to computations of a cross-correlation metrics between the image and each predetermined image included in the set of predetermined images. The centroid 760 of a cross-correlation metric can include entries in the cross-correlation metric corresponding to a peak cross-correlation value.

In some embodiments of the current subject matter, comparisons between the image and the predetermined images included in the set of predetermined images can utilize the computational geometry domain system. Utilizing the computation geometry domain can facilitate determining one or more estimates of a probable behavior of a test behavior associated with the image. For example, a portion of the boundary of an image can be compared to a portion of a predetermined image to determine. By comparing these local sections of the image to corresponding local sections of the predetermined image, the current subject matter can determine if the test behavior associated with the image exhibits similarities to one or more defects associated with the one or more predetermined images included in the set of predetermined images. This local comparison can facilitate troubleshooting the performance of a target 106 and determining the deterioration of the predetermined images.

Figure 8A:
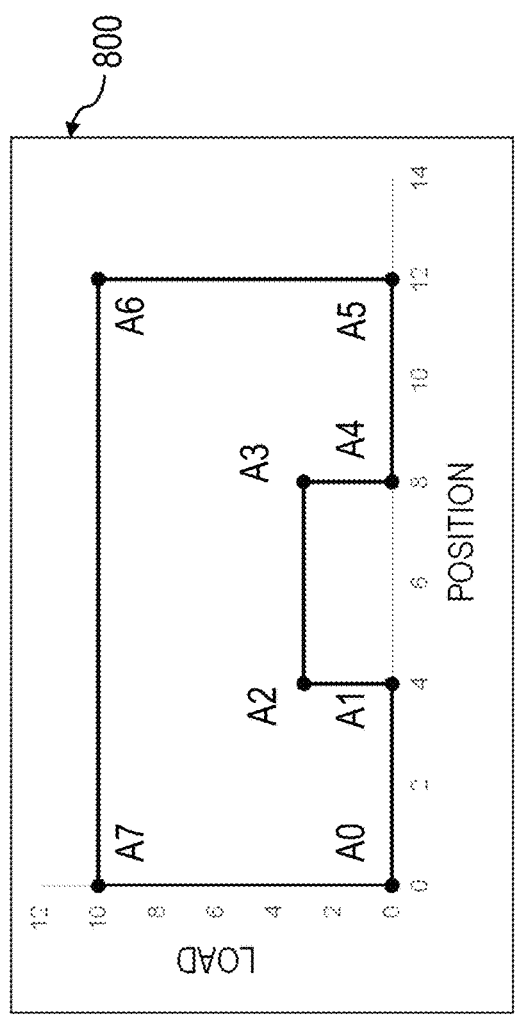
FIGS. 8A-8B are exemplary plots illustrating a turning function transformation of an image.
Figure 8B:
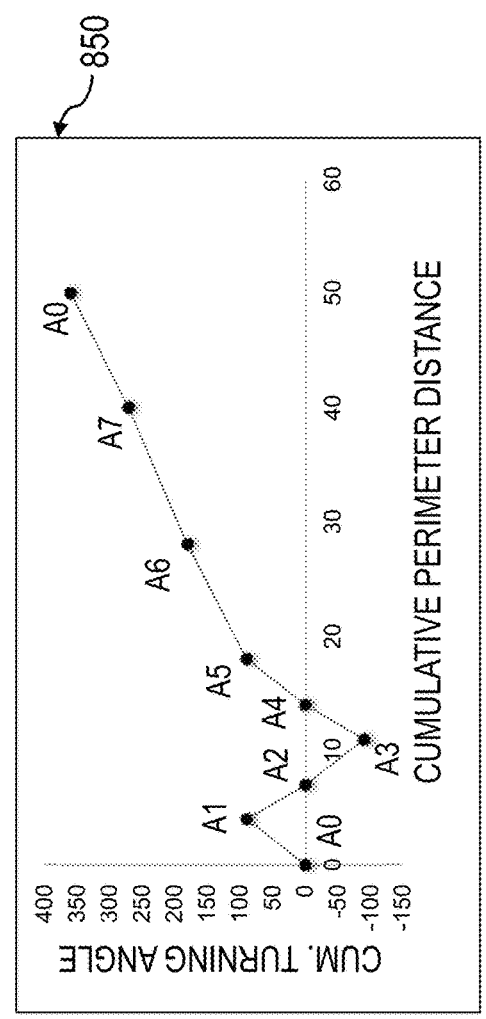

FIG. 8A is an exemplary embodiment of a plot 800 of measurement data including the adjusted load as a function of the adjusted position. For example, the position can correspond to position and the load can correspond to load. In accordance with some embodiments of the current subject matter, the plot can be transformed into a turning function. FIG. 8B is an exemplary embodiment of a plot 850 representing the plot 800 of FIG. 8A after transformation into a test plot of cumulative turning angle as a function of cumulative perimeter distance. For example, the turning function transformation can begin at point A0 in the plot of FIG. 8A. As discussed above, counter-clockwise rotation in the polygonal curve corresponds to a positive turning angle and clockwise rotation in the polygonal curve corresponds to a negative turning angle. Starting at the point A0 in the load-position plot of FIG. 8A, the perimeter distance is 0 and the angle change is 0. Thus, the cumulative perimeter distance plotted in the turning angle diagram of FIG. 8B corresponding to A0 is 0 cumulative perimeter distance and 0 cumulative turning angle. At point A1, the perimeter distance changes by 4 units (length of segment A0-A1) and the turning angle changes from 0 to positive 90 degrees. As a result, the cumulative perimeter distance increases to 4 units and the cumulative turning angle increases to 90 degrees. At point A2, the perimeter extends by 3 units (the length of segment A1-A2) and the turning angle decreases 90 degrees to zero. This yields a cumulative perimeter distance of 7 units (4 units+3 units) and a cumulative turning distance of 0 degrees (90 degrees-90 degrees) at the point labeled A2 in FIG. 8B. Similarly, at point A3, the perimeter increases by 4 units (length of segment A2-A3) and the turning angle is negative 90 degrees, yielding a cumulative perimeter distance of 11 units (7 units+4 units) and a cumulative turning angle of negative 90 degrees (0 degrees-90 degrees). Continuing in this manner, the plot of FIG. 8B is generated for movement along the perimeter until point A0 is reached.

Figure 9A:
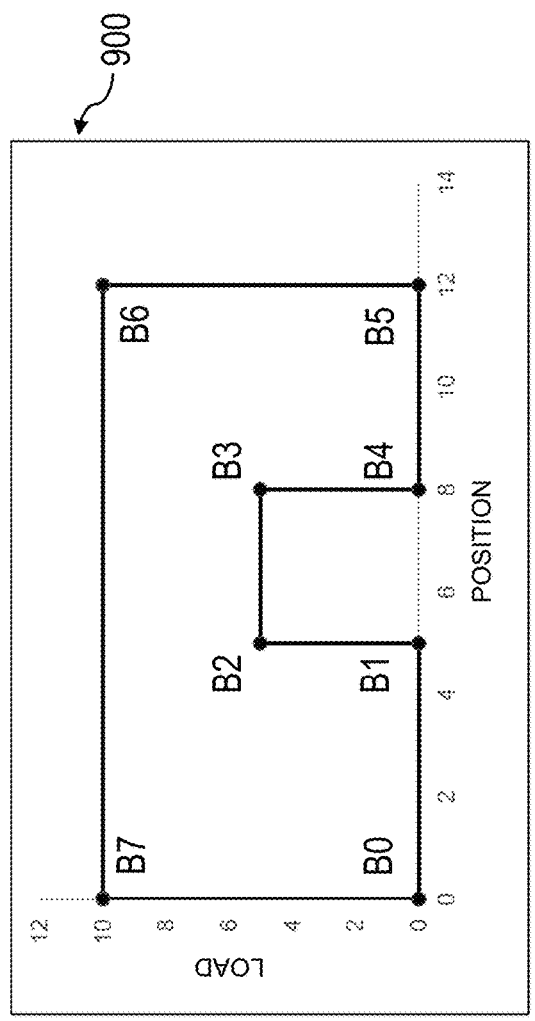
FIGS. 9A-9B are exemplary plots illustrating a turning function transformation of a predetermined image.
Figure 9B:
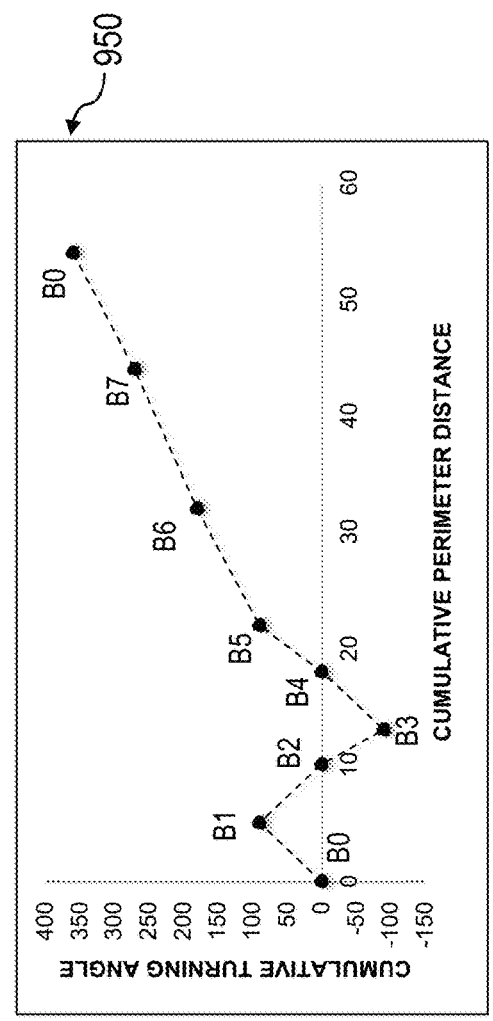

FIG. 9A is an exemplary embodiment of a plot of a predetermined image including the adjusted load as a function of the adjusted position. For example, the position can correspond to position and the load can correspond to load. In accordance with some embodiments of the current subject matter, the plot can be transformed into a turning function. FIG. 9B is an exemplary embodiment of the plot in FIG. 9A after transformation into a reference plot of cumulative turning angle as a function of cumulative perimeter distance. For example, the turning function transformation can begin at a point B0 in the plot of FIG. 9A. At the point B0, the cumulative perimeter distance is 0 and the cumulative turning angle is 0. Following the perimeter of the plotted polygon from the point B0 to a point B1 can yield a cumulative perimeter distance of 5 and a cumulative turning angle of positive 90 degrees. Following the perimeter of the plotted polygon from the point B1 to a point B2 can yield a cumulative perimeter distance of 10 and a cumulative turning angle of 0 degrees. Following the perimeter of the plotted polygon from the point B2 to a point B3 can yield a cumulative perimeter distance of 13 and a cumulative turning angle of negative 90 degrees. Continuing in this manner, the plot of FIG. 9B is generated for movement along the perimeter until point B0 is reached.

Figure 10A:
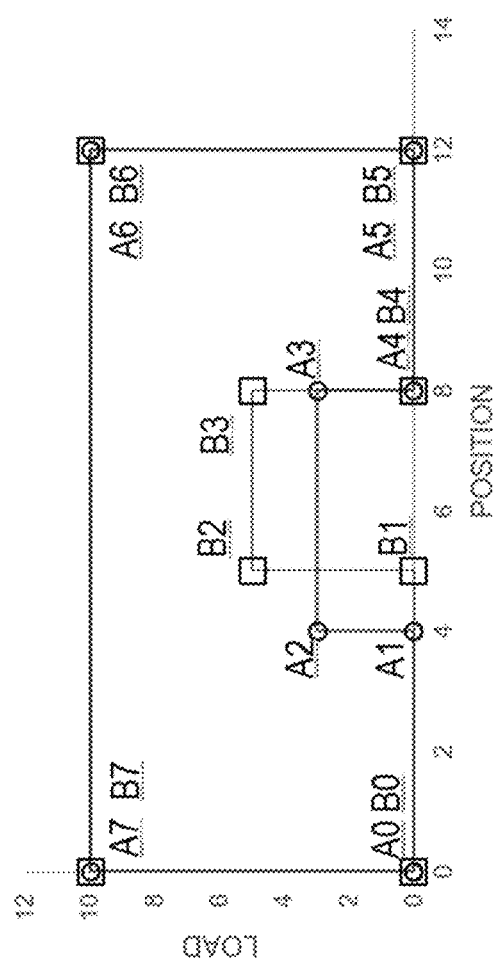
FIGS. 10A-10B are exemplary plots illustrating a turning function transformation of an image and a predetermined image.
Figure 10B:
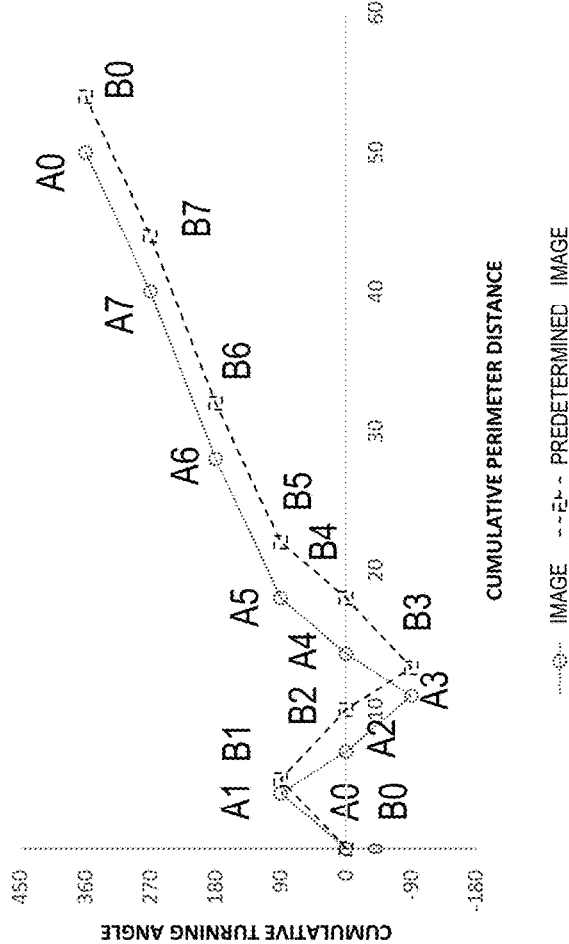

FIG. 10A is an exemplary embodiment of the plot 900 of the predetermined image illustrated in FIG. 9A overlaid upon the plot 800 of the measurement data illustrated in FIG. 8A. FIG. 10B overlays the turning angle plots 950 and 850. In accordance with some embodiments of the current subject matter, a distance between the test plot 850 illustrated in FIG. 8B and the reference plot 950 illustrated in FIG. 9B can be calculated. For example, a Euclidean distance or $L_p$ metric can be computed between the test plot 850 illustrated in FIG. 8B and the reference plot 950 illustrated in FIG. 9B.

Figure 11:
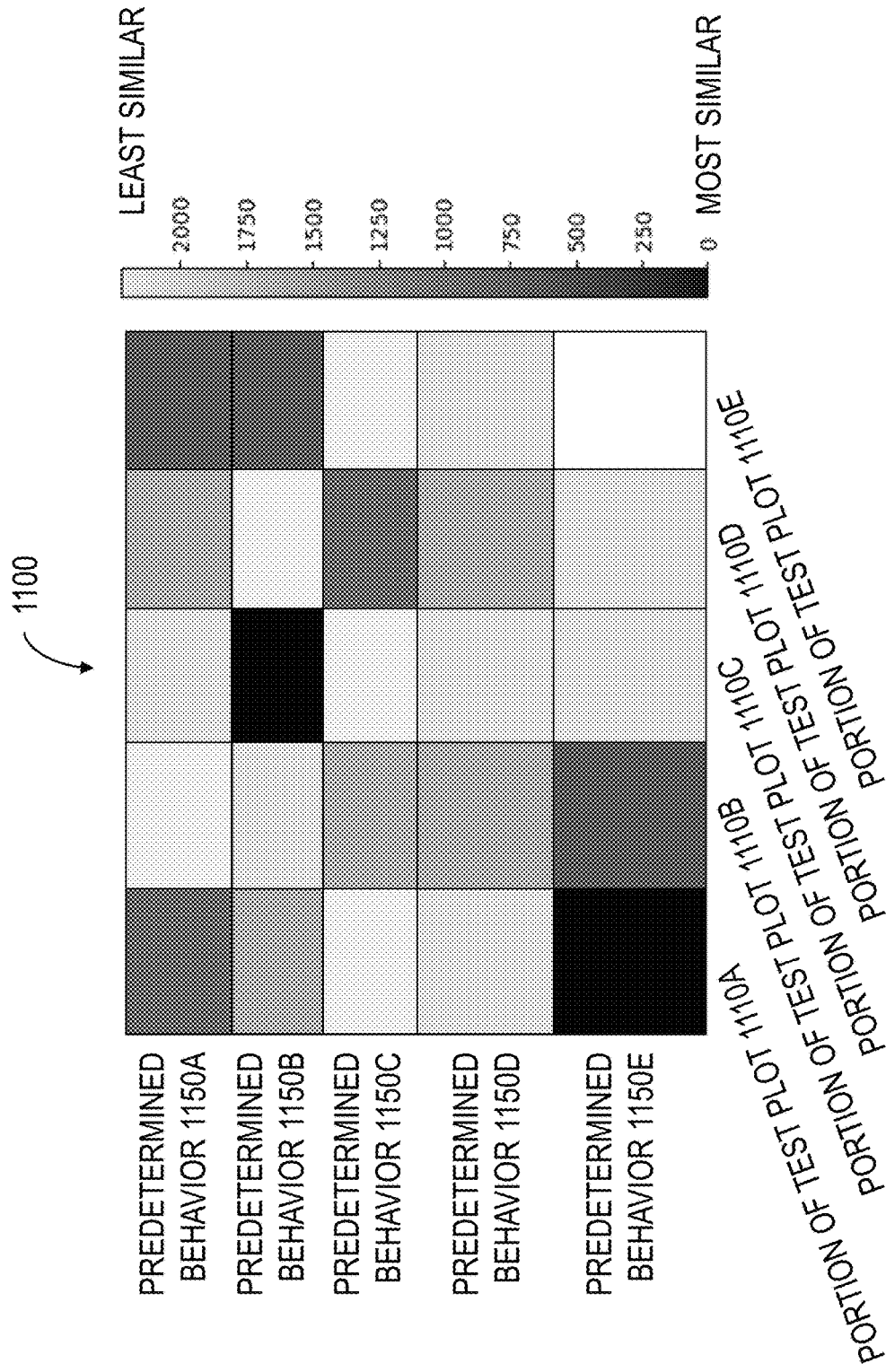
FIG. 11 is a diagram illustrating an exemplary embodiment of a visual representation of a distance matrix of one or more defects in an image.

FIG. 11 is an exemplary embodiment of a distance matrix. The distance matrix 1100 can provide a visual representation of the measure of similarity between portions of the test plot corresponding to an image and each predetermined image associated with a defect. For example, a set of predetermined images can include five predetermined images associated with five defects 1150A-1150E and a test plot corresponding to an image can include five portions 1110A-1110E. In this exemplary embodiment, the distance matrix 1100 can include twenty-five entries, with each entry corresponding to a defect 1150A-1150E and a portion of the test plot 1110A-1110E. A visual representation of the similarity between a defect 1150A-1150E and a portion of the test plot 1110A-1110E can include a color selected from a color scale ranging from most similar to least similar based on a measure of dissimilarity between a portion of the reference plot associated with the defect 1150A-1150E and the corresponding portion of the test plot 1110A-1110E. For example, the defect 1150E has a low measure of dissimilarity (e.g., very similar) with the portion 1110A and the defect 1150B has a low measure of dissimilarity (e.g., very similar) with the portion 1110C. As a result, the one or more determined defects for the test behavior represented by the image can include defect 1150E and 1150C.

Also, the distance matrix 1100 can be utilized to add an image exhibiting defects to the set of predetermined images associated with defects. For example, in general, an image can be identified as matching, or at least being similar to, one or more predetermined images of the set of predetermined images when their respective distance is less than a threshold value. This group including the image and the identified matches can be considered to be a cluster, given their similarity based upon the distance. However, for a given distance threshold value, there may be no predetermined images that the image exhibiting defects can be clustered with. Under this circumstance, the image can be considered to represent a defect condition that is sufficiently dissimilar from defect conditions represented by the predetermined images that it would not be appropriate to cluster the image with other predetermined images. Because it can be beneficial to expand the set of predetermined images to allow identification of additional defect conditions, the image can be added to the set of predetermined images.

Figure 12:
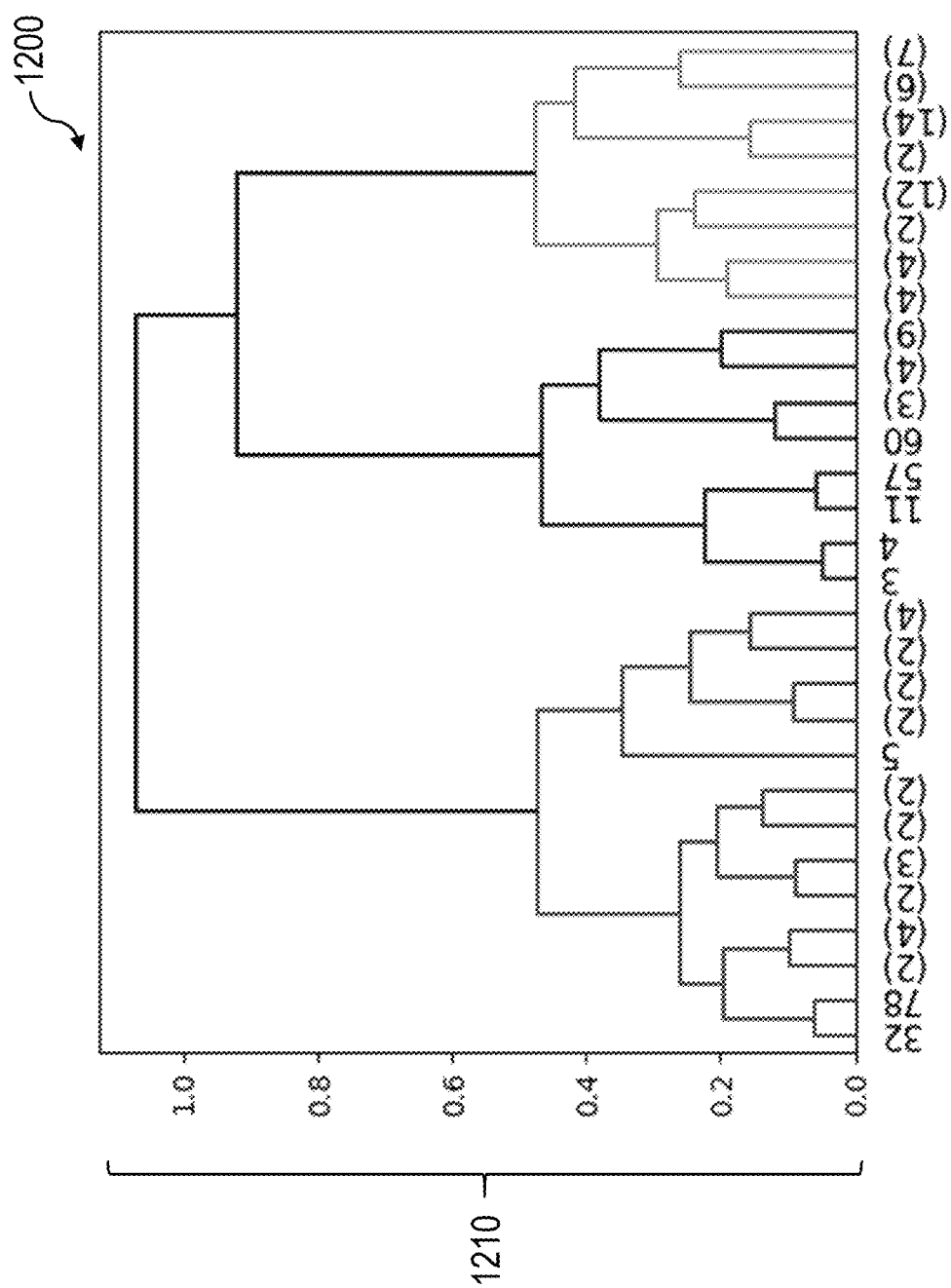
FIG. 12 is a diagram illustrating an exemplary embodiment of a visual representation of hierarchical clustering.

Determining an appropriate level for the threshold value can be challenging. To facilitate this determination, a hierarchy of clustering can be generated to better understand the effect that changing the threshold value has on clustering of the set of predetermined images. FIG. 12 is a diagram illustrating an exemplary embodiment of a hierarchical relationship between clusters of predetermined images in the set of predetermined images. For example, a cluster can be determined by measuring dissimilarity between pairs of predetermined images. A dissimilarity of each cluster can be established as a function of the pairwise distance between predetermined images in the respective clusters. The result is a set of clusters, where each cluster can be distinct from other clusters, and the images within each cluster can be broadly similar to each other.

Hierarchical clustering can treat each image as a separate cluster. Then, it can repeatedly identify the two clusters that are closest together (e.g., least dissimilar within a specified clustering threshold value) and merge the two most similar clusters. This can continue until all the clusters are merged together.

A dendrogram 1200 can illustrate clusters formed from different clustering threshold values 1210. As illustrated in FIG. 12, with a cluster threshold value of 0.2, the predetermined image indexed as number 32 within the set of predetermined images and the predetermined image with index 78 within the set of predetermined images can be clustered together. This can be illustrated by a horizontal line in the dendrogram 1200. Within the dendrogram 1200, a number in parenthesis, such as (2), can illustrate that two predetermined images are clustered together. Similarly, (4) can illustrate that four predetermined images are clustered together.

Figure 13B:
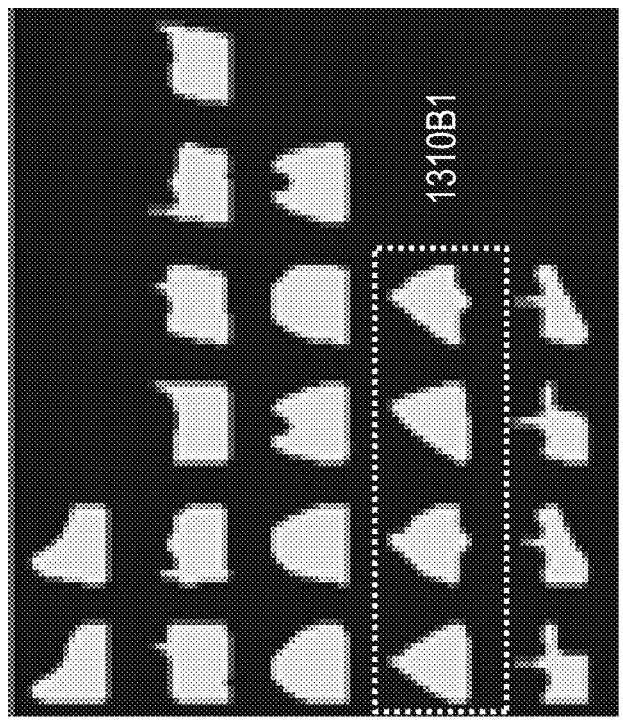
FIGS. 13A-13B are diagrams illustrating exemplary embodiments of clusters generated utilizing different threshold values.
Figure 13A:
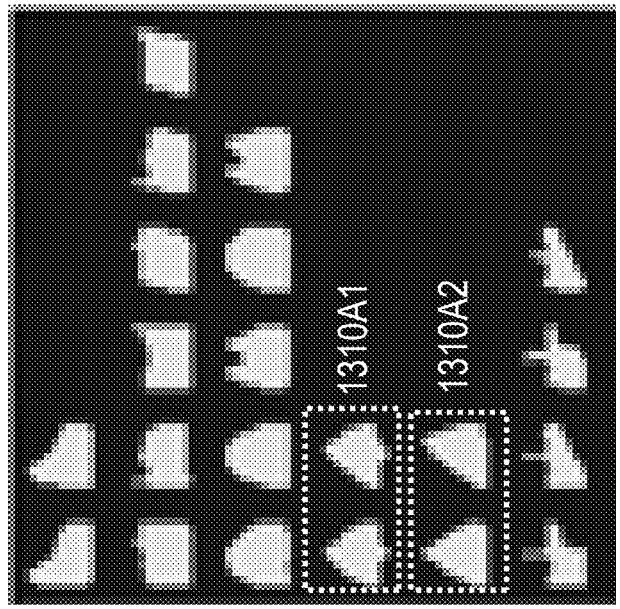

FIGS. 13A-13B are exemplary embodiments of clusters formed by different clustering thresholds. For example, utilizing a clustering threshold value of 0.25 can result in the clusters illustrated in FIG. 13A. Similarly, utilizing a clustering threshold value of 0.35 can result in the clusters illustrated in FIG. 13B.

As further illustrated in FIGS. 13A-13B, each distinct cluster occupies a distinct row. This representation can be beneficial for subsequent operator evaluation regarding the clustering threshold value. For instance, when the clustering threshold value is 0.25, cluster 1310A1 and cluster 1310A2 are presented on different lines, symbolizing that these two clusters represent different defect conditions. In contrast, when the clustering threshold value is increased to 0.35, clusters cluster 1310A1 and cluster 1310A2 are combined into cluster 1310B1, presented on the same line, symbolizing that these clusters represent similar or the same defect conditions.

With this representation, an operator is provided transparency into the pattern matching performed by embodiments of the disclosed pattern matching systems and methods. The operator can test the effects of different clustering threshold values and make appropriate adjustments, Should the operator find that a given clustering threshold value does not result in clustering of predetermined images previously known to represent similar or the same defect conditions, the operator can increase the clustering threshold value. Conversely, should the operator find that a given clustering threshold value results in clustering of predetermined images representing known to represent different defect conditions, the operator can decrease the clustering threshold value.

Exemplary technical effects of the methods, systems, and devices described herein include, by way of example, automated real time detection of unsatisfactory operating conditions and/or performance deterioration of monitored equipment using pattern matching of downhole cards and reference cards of a library. Pattern matching can be performed according to a variety of techniques (e.g., using an image representation or turning functions), allowing for accelerated query execution, and rapidly performing the defect detection for thousands of wells over time. In some embodiments, these two techniques can be combined, where possible defect behaviors are initially identified using the image representation technique (e.g., global matches). Subsequently, the turning function technique can be employed to compare selected portions of the initially identified reference cards and the downhole card (e.g., local matches) to eliminate false positives from the initial list of possible defect behaviors and/or confirm the presence of multiple defect behaviors occurring simultaneously. In additional embodiments, a reference library containing reference cards can be augmented by the addition of downhole cards which are not matched to existing reference cards, allowing for new understanding of unsatisfactory operating condition and performance deterioration.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A method comprising:
receiving data characterizing a load on a rod of a downhole pump at different positions of a stroke of the rod;
determining an image characterizing the load of the rod at the different positions of the stroke;
determining a defect in operating conditions of the downhole pump by comparing the determined image to a set of predetermined images with associated defects; and
outputting a notification representing the determined defect;
wherein the set of predetermined images includes at least a first predetermined image and a second predetermined image, and wherein the comparing further comprises:
calculating a first cross-correlation metric between the determined image and the first predetermined image and a second cross-correlation metric between the determined image and the second predetermined image;
determining a first peak of the first cross-correlation metric and a second peak of the second cross-correlation metric; and
determining a quantitative ranking order between the first peak and the second peak;
wherein the determined defect corresponds to a predetermined defect associated with a predetermined image from the first predetermined image and the second predetermined image with a highest ranked peak in the quantitative ranking order.

2. A method comprising:
receiving data characterizing a load on a rod of a downhole pump at different positions of a stroke of the rod;
determining an image characterizing the load of the rod at the different positions of the stroke;
determining a defect in operating conditions of the downhole pump by comparing the determined image to a set of predetermined images with associated defects; and
outputting a notification representing the determined defect;
wherein the set of predetermined images includes at least a first predetermined image and the comparing further comprises:
receiving data characterizing a dissimilarity threshold;
transforming the determined image into a plot of cumulative turning angle as a function of cumulative perimeter distance;

transforming the first predetermined image into a first predetermined plot of cumulative turning angle as a function of cumulative turning angle; and determining a first distance between a portion of the plot and a corresponding portion of the first predetermined plot to be below the dissimilarity threshold;

wherein the determined defect includes at least a predetermined defect associated with the first predetermined image.

3. The method of claim 1, wherein determining the image further comprises:

plotting the load as a function of positions of the stroke;

interpolating a boundary around the plot, the boundary enclosing an interior region of the plot; and assigning a first pixel value to points inside the interior region and a second pixel value to points outside the interior region.

4. The method of claim 1, wherein similarly shaped images of the set of predetermined images are clustered together based on a hierarchical clustering.

5. The method of claim 4, wherein the hierarchical clustering is based on a threshold value.

6. The method of claim 1, wherein the associated defects comprise at least one of incomplete pump fillage, gas interference, tubing movement, excessive fluid slippage, bottom pump tagging, top pump tagging, erratic valve action, plunger sticking, or excessive friction.

7. The method of claim 1, wherein the load is measured by a dynamometer.

8. The method of claim 1, wherein the determined image is added to the set of predetermined images.

9. A system comprising:

at least one data processor;

a memory storing instructions which, when executed by the at least one data processor, causes the at least one data processor to perform operations comprising:

receiving data characterizing a load on a rod of a down-hole pump at different positions of a stroke of the rod;

determining an image characterizing the load of the rod at the different positions of the stroke;

determining a defect in operating conditions of the down-hole pump, the determining including comparing the determined image to a set of predetermined images with associated defects; and providing the determined defect;

wherein the set of predetermined images includes at least a first predetermined image and a second predetermined image, and wherein the comparing further comprises:

calculating a first cross-correlation metric between the determined image and the first predetermined image and a second cross-correlation metric between the determined image and the second predetermined image;

determining a first peak of the first cross-correlation metric and a second peak of the second cross-correlation metric; and determining a quantitative ranking order between the first peak and the second peak;

wherein the determined defect corresponds to a predetermined defect associated with a predetermined image from the first predetermined image and the second predetermined image with a highest ranked peak in the quantitative ranking order.

10. A system comprising:

at least one data processor;

a memory storing instructions which, when executed by the at least one data processor, causes the at least one data processor to perform operations comprising:

receiving data characterizing a load on a rod of a down-hole pump at different positions of a stroke of the rod;

determining an image characterizing the load of the rod at the different positions of the stroke;

determining a defect in operating conditions of the down-hole pump, the determining including comparing the determined image to a set of predetermined images with associated defects; and providing the determined defect;

wherein the set of predetermined images includes at least a first predetermined image and the comparing further comprises:

receiving data characterizing a dissimilarity threshold;

transforming the determined image into a plot of cumulative turning angle as a function of cumulative perimeter distance;

transforming the first predetermined image into a first predetermined plot of cumulative turning angle as a function of cumulative turning angle; and determining a first distance between a portion of the plot and a corresponding portion of the first predetermined plot to be below the dissimilarity threshold;

wherein the determined defect includes at least a predetermined defect associated with the first predetermined image.

11. The system of claim 9, wherein determining the images further comprises:

plotting a plot of the load as a function of positions of the stroke of the rod;

interpolating a boundary around the plot, the boundary enclosing an interior region of the plot; and assigning a first pixel value to points inside the interior region and a second pixel value to points outside the interior region.

12. The system of claim 9, wherein similarly shaped images of the set of predetermined images are clustered together based on a hierarchical clustering.

13. The system of claim 12, wherein the hierarchical clustering is based on a threshold value.

14. The system of claim 9, wherein the load on the rod of the down-hole pump at different positions of the stroke of the rod is measured by a dynamometer.

15. The system of claim 9, wherein the determined image is added to the set of predetermined images.

16. A non-transitory computer program product storing instructions, which when executed by at least one data processor of at least one computing system, implement operations comprising:

receiving data characterizing a load on a rod of a down-hole pump at different positions of a stroke of the rod;

determining an image characterizing the load of the rod at the different positions of the stroke;

determining a defect in operating conditions of the down-hole pump by comparing the determined image to a set of predetermined images with associated defects; and providing the determined defect;

wherein the set of predetermined images includes at least a first predetermined image and a second predetermined image, and wherein the comparing further comprises:

calculating a first cross-correlation metric between the determined image and the first predetermined image and a second cross-correlation metric between the image and the second predetermined image;

determining a first peak of the first cross-correlation metric and a second peak of the second cross-correlation metric; and determining a quantitative ranking order between the first peak and the second peak;

wherein the determined defect corresponds to a predetermined defect associated with a predetermined image from the first predetermined image and the second predetermined image with a highest ranked peak in the quantitative ranking order.

17. A non-transitory computer program product storing instructions, which when executed by at least one data processor of at least one computing system, implement operations comprising:

receiving data characterizing a load on a rod of a downhole pump at different positions of a stroke of the rod;

determining an image characterizing the load of the rod at the different positions of the stroke;

determining a defect in operating conditions of the downhole pump by comparing the determined image to a set of predetermined images with associated defects; and providing the determined defect;

wherein the set of predetermined images includes at least a first predetermined image and the comparing further comprises:

receiving data characterizing a dissimilarity threshold;

transforming the determined image into a plot of cumulative turning angle as a function of cumulative perimeter distance;

transforming the first predetermined image into a first predetermined plot of cumulative turning angle as a function of cumulative turning angle; and determining a first distance between a portion of the plot and a corresponding portion of the first predetermined plot to be below the dissimilarity threshold;

wherein the determined defect includes at least a predetermined defect associated with the first predetermined image.

18. The non-transitory computer program of claim 16, wherein determining the image further comprises:

plotting the load as a function of positions of the stroke;

interpolating a boundary around the plot, the boundary enclosing an interior region of the plot; and assigning a first pixel value to points inside the interior region and a second pixel value to points outside the interior region.

19. The non-transitory computer program of claim 16, wherein similarly shaped images of the set of predetermined images are clustered together based on a hierarchical clustering.

20. The non-transitory computer program of claim 19, wherein the hierarchical clustering is based on a threshold value.

21. The non-transitory computer program of claim 16, wherein the associated defects comprise at least one of incomplete pump fillage, gas interference, tubing movement, excessive fluid slippage, bottom pump tagging, top pump tagging, erratic valve action, plunger sticking, or excessive friction.

22. The non-transitory computer program of claim 16, further storing instructions, which when executed by at least one data processor of at least one computing system, implement operations comprising adding the determined image to the set of predetermined images.

* * * * *